(No Model.)
2 Sheets—Sheet 1.
E. THOMSON.
PROTECTION FOR THE INSULATION OF DYNAMO ELECTRIC MACHINES.
No. 508,649.
Patented Nov. 14, 1893.
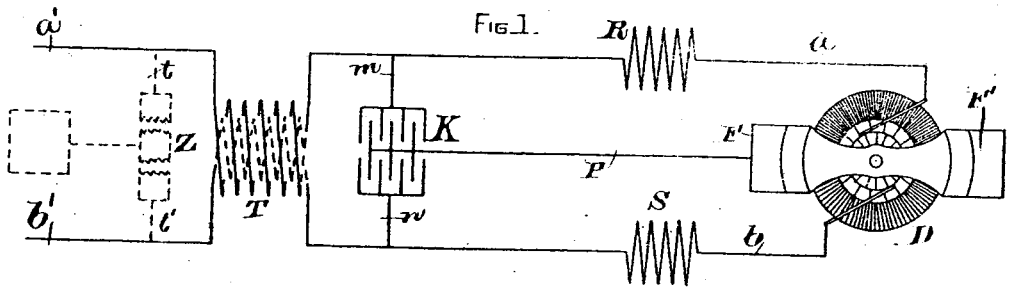
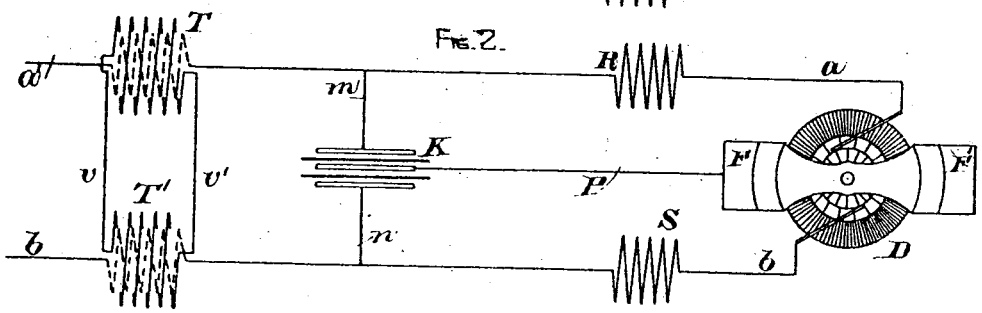
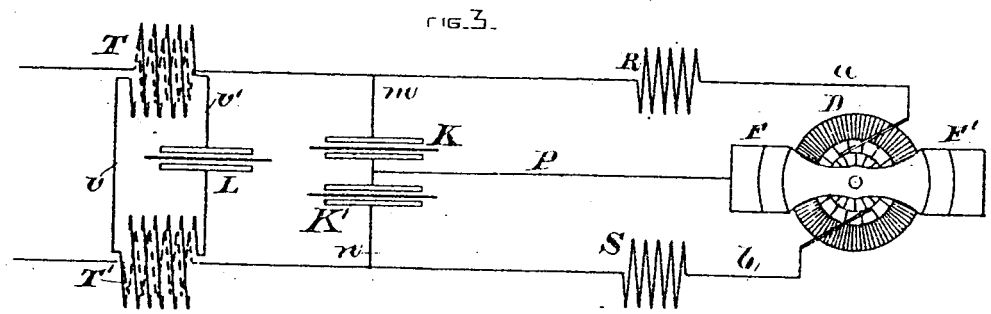
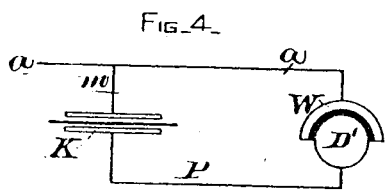
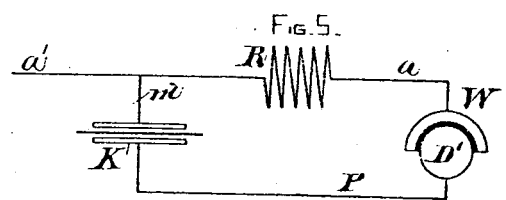
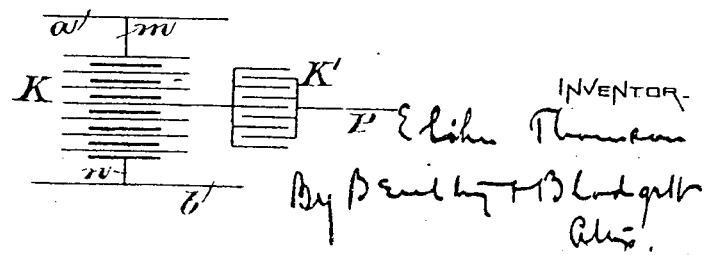
WITNESSES.
INVENTOR.

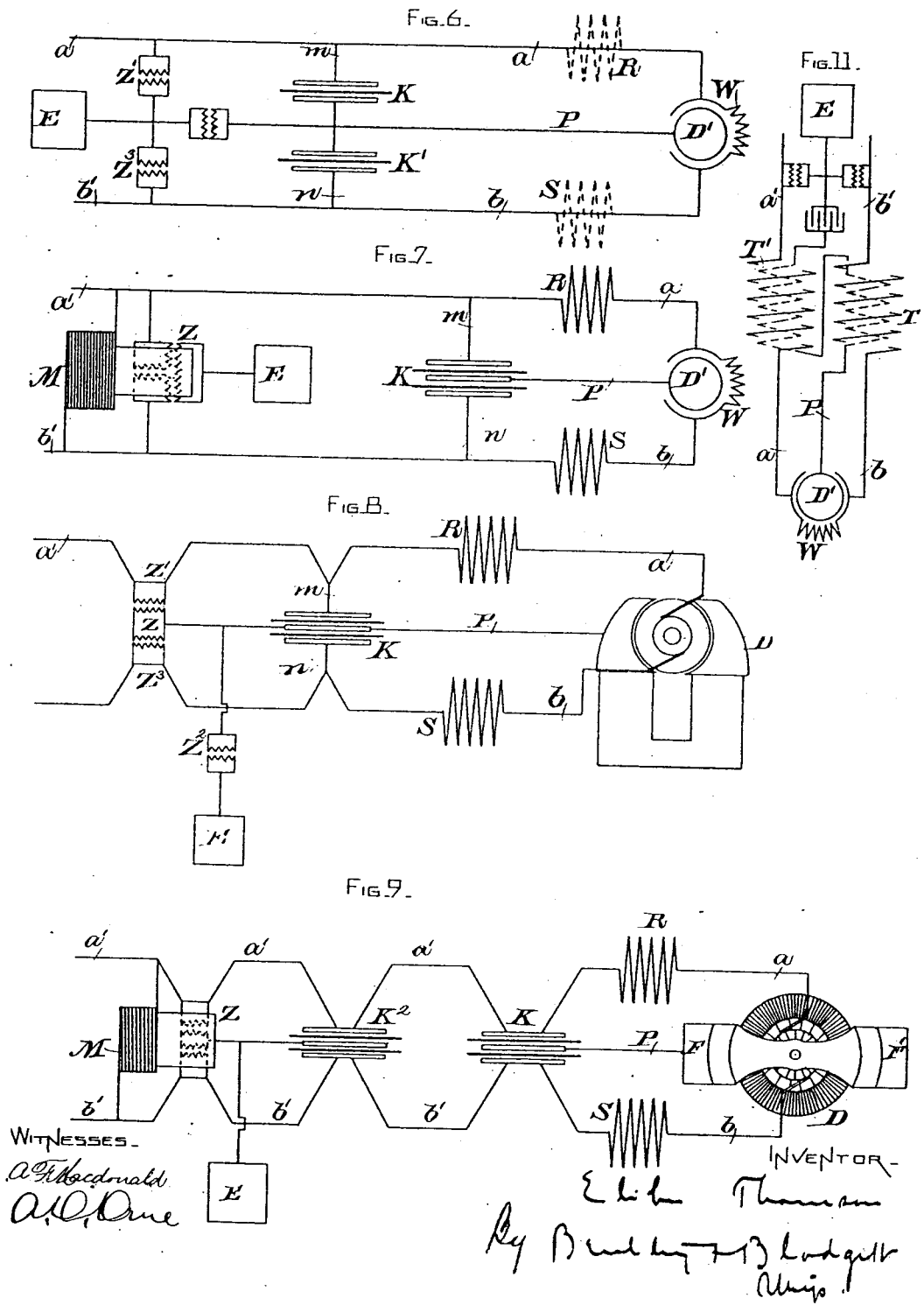

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

PROTECTION FOR THE INSULATION OF DYNAMO-ELECTRIC MACHINES.

SPECIFICATION forming part of Letters Patent No. 508,649, dated November 14, 1893.

Application filed August 26, 1891. Serial No. 403,755. (No model.)

*To all whom it may concern:*

Be it known that I, ELIHU THOMSON, a citizen of the United States, residing at Swampscott, county of Essex, and State of Massachusetts, have invented certain new and useful Improvements in the Protection of the Insulation of Dynamo-Electric Machines, of which the following is a specification.

My present invention relates to a means for the protection of the insulation of dynamo electric machines, motors, transformers, and other such apparatus, from discharges of lightning or induced static discharges reaching them from the line or lines to which they are connected.

Briefly, my invention consists in establishing as far as possible, on the occurrence of any rush of current of high potential toward the dynamo machines or other devices to be protected, of an equalization of the potential of its various parts, at least such as will not permit the differences of potential to much exceed such as may be easily supported by the insulation or dielectric material used in the construction of the apparatus, whereby according to my system the machine is protected from disruptive perforation of its insulation, or from burning out by such perforation when it is followed up by the generated current or by the current of the line.

In the accompanying drawings, Figure 1 is a diagram of a dynamo and circuit supplied thereby protected in accordance with my invention. Figs. 2 to 10 are diagrams showing modified arrangements of protecting devices.

In Fig. 1 D may represent a dynamo to be protected; $a\ b$ its terminal or wire connections to line, one of which may be an earth circuit. Such a machine usually has its wire well insulated from the cores both of the armature and of the field magnet. I have not shown any field magnet connections as they may be understood to be in series, or shunt or both, or the field magnet, part of the frame of which may be indicated by F, F', may be separately excited from any other source of current. I have chosen a dynamo machine to exemplify my invention because in it the conditions are much exaggerated in the case of static discharge disturbances. I have assumed that the frame of the machine is made practically of a connected mass of metal, field cores, armature cores, shaft, supports, &c. Should any of these parts be highly insulated one from the other my invention may be readily modified to be applicable to such differences of structure. The line of connections shown at $a\ b$ are continued on as at $a'\ b'$ to whatever distance is desirable and may be subject therefore to static induction from lightning or to actual disruptive lightning discharges reaching the line. Such discharges will readily penetrate the insulation of the machines as ordinarily constructed unless met with counterbalancing actions. In my invention I provide as at K a condenser, which may be a triple condenser, or be composed of two condensers, or a number of condensers, acting similarly. By triple condenser I mean a three-foil condenser or a condenser with three sets of metal condensing surfaces and with a dielectric interposed and three terminals taken therefrom, all of the foils being in inductive relation statically. From the line $a$, I make a short connection at $m$ to one foil of the triple condenser. To line $b$, I make a short connection $n$ to another foil of the triple condenser, and the remaining portion of the condenser is connected to the line P of rather short length and is carried to the frame of the machine to be protected and its cores, as its armature core and metal masses in connection therewith.

Preferably, though this is not essential, I insert a few turns of wire R S, wound in an open large diameter coil preferably, in each of the connections between the machine and the points $m\ n$ to act as a self-induction of moderate amount in case of a very sudden or quick discharge tending to move along the line.

The devices as thus far described would of themselves be fairly effective in warding off injury to the machine D, but I prefer to add to or supplement their action, by other devices, one of which, forming a portion of my invention, is seen at T. This is a double coil the turns of which are highly insulated from each other, and one coil of which is connected in line from $a$ to $a'$ and the other coil, in inductive relation to the former, is connected in the line from $b$ to $b'$. The direction of the winding is such that an impulse of current starting at, say, $a'$ through one coil in passing toward $a$ will induce a discharge starting at $b'$ and passing toward $b$, and the number of turns in the coil depends upon the conditions of service. These coils may surround a finely divided and highly insulated iron core, but such a core is not necessary, as the mutual induction of the coils for very sudden discharges is sufficiently great when only an air space or air core exists within the coils.

I have shown in dotted lines besides the arrangements described a set of discharge plates Z connecting at $t$ $t'$ to lines $a'$ $b'$ by short connections, spaces existing between the outer plates and the middle plates connected to good earth by a short connection, leaving two spark gaps, one from each side of the line to earth. Arc rupturing devices of any nature may be employed to break any arcs that may form at these discharge spaces, which is made as short as is consistent with keeping them out of contact. This provision is merely a safeguard in rendering the present invention more effective. I will now give the rationale of the operation of the devices thus constituted. A discharge entering the line at $a'$ and tending to run toward the dynamo D will induce by the coils T a similar discharge entering at $b'$ and tending to run toward the dynamo D by the line $b$. These discharges are assumed to be of high potential and have considerable striking distance. This inductive effect mentioned between the two coils tends to equalize the electric pressures on the two sides of the dynamo, or on the two sides of the winding, such as the armature winding, where otherwise a vast difference might exist, resulting in disruption and burning of the insulation. Similarly lightning discharges may give rise to these rapid fluxes of current, and burn out the insulation between the winding and the frame, or the field coils and the frame, in the electrifying or bringing to the same condition of electrical state such portions of the machine. To avoid this the condenser K is provided. The discharges coming from the line $a'$ $b'$ are diverted at $m$ $n$ into the condenser K, which is made of considerable capacity, and with as thin a dielectric as is consistent with safety from puncturing, while the self-inductive coils R S, inserted in the line on each side, tend to stop off the quick rush of current toward the dynamo D and force it into the condenser K. There it reacts on the middle coil, or on the surface connected to wire P to send out a discharge of like character along the connection P to charge up the field frame F F', the armature core, and in fact the whole metallic mass of the machine to a potential similar in sign and corresponding in degree to that which reached the line and which travels by the line toward the machine. If, for example, the impulse is positive or tends to bring the armature winding into a highly charged positive state the condenser will discharge through the connection P a positive discharge and therefore make the cores of the machine positive, and this may occur to a degree to effectively oppose any statically disruptive charge or tendency to break down the insulation of the coils. Care should be taken that the capacity of the condenser K is great enough to produce the effect mentioned, and that the framework of the machine is not in such connection with the ground, as would allow the effect of the condenser to be lost. It is also desirable not to have the connection P, and the line connection between the machine and $m$ $n$ differ too greatly in length. The openly wound coils R S may be made of a few turns to give preponderance of length and self-induction to that line so that the discharge from the condenser through the line P may readily reach the frame-work of the machine and begin charging it before the winding of the machine has reached so high a potential as to cause disruption. The principle of my invention is thus the equalization by induction of the potentials over the whole machine, so that the tension or electrification of the discharge is communicated simultaneously to all parts of the machine, whereby any differences of potential capable of disruptive effects are avoided. The double coil T does this by its dynamic induction, and tends to equalize the potential on the two sides, while the condenser K affects the cores by its static induction. The condenser K would require, in ordinary cases, to have a greater capacity than the windings of the machine, the object being to equalize the potential and supply an inductive effect to charge the free portions of the machine, such as its frame.

In Fig. 2 the double coil T is replaced by two coils T T', one coil of each double coil being connected so as to form a closed circuit through connections $v$ $v'$. The directions of the windings required to be selected are, as before, so that a discharge of current running from $a'$ to $a$ would induce a secondary current or discharge from $b'$ to $b$. K represents a condenser, as before.

In Fig. 3 the triple condenser K is divided into two condensers K and K', one foil from each being connected to the middle connection P, while the others are connected at $m$ and $n$ respectively, as before. The coils T and T' in this instance are arranged as in Fig. 2, but the connection through $v'$ is made by a condenser at D. There is nothing to prevent a condenser being used at $v$, and if the condensers are of sufficient capacity they will answer all the purposes required, as the impulses which move in the double coils under static discharges are almost instantaneous and do not represent a large volume of current.

Fig. 4 is a simple diagram to illustrate the principle of the invention. D' represents the core of an armature, or field or framework of a machine to be protected, while W is the winding separated by the black line, representing dielectric or insulation. K is a condenser, and $m$ the connection as before to one foil thereof from the line $a\ a'$, while P is the connection from the core or framework to the other foil. Let us now suppose that the connection P be entirely severed and that the framework or core D' be connected to a mass of metal furnishing an escape, as it were, for a certain portion of the discharge. There then would be a great tendency in the case of a static discharge of high potential passing along the line to jump the insulation between W and D'. But with the connection P and the condenser arranged as shown the effect of the condenser K is to rapidly charge the core portion D with the same potential as that which has reached the line and it will therefore set up a counter or back pressure to the discharge tending to oppose the passage of a charge across the dielectric between D' and W. Usually, however, since the framework or cores D' may be connected to rather extended surfaces it will be desirable to check the impulse running toward the winding W and retard it somewhat, as by means of a reactive coil R, placed as shown in Fig. 5, in the circuit to the winding, allowing the condenser K to fully charge before much flow of current has passed to W. In this case the elevation of the potential or counter-potential, as it may be termed, of the framework or cores D' will be more speedy, and will be actually ahead of the rush of current to W.

Fig. 6 shows a slightly modified arrangement in which the inductive coil T, Fig. 1, is left out and in which the line P is extended away from the cores D' of the machine to be protected, to a discharge gap or disruptive space between the line P and earth plate connection E, while other gaps Z Z' Z³ are provided between the respective sides of the line and earth.

Fig. 7 is a device discharging from either side of the line to earth or to the other side of the line, whereby an excessive difference of potential between the line and earth or between the two sides of the line may be in part discharged. This gives an approximate equalization of potential on the two sides of the line, and a condenser K, with its connections, as before, has the effect of equalizing the potentials on the cores. At M is indicated a magnet acting to blow out or rupture any arc which may form at the triple discharge plate Z. This magnet may be in any suitable way energized to establish a field in which the plates exist which field disturbs and extinguishes arcs tending to short-circuit the line, or to connect the same to earth permanently.

The modification shown in Fig. 8 is similar to that of Fig. 7, but the line discharge plates Z' Z² are here energized to discharge onto the plate Z connected to connection P, a supplementary discharge device Z' being provided between connection P and the ground.

In Fig. 9 a second condenser K² is provided, the middle plate or section of which is carried to earth at E, while there is also an earth and line discharge plate forming one of a set of discharge plates Z as in Fig. 7. In this case the action of the condenser K² is to relieve in a large measure the static discharges which are moving toward the machine by condensing them and at the same time allowing them to discharge at Z to earth from whichever side of the line they may come. If the capacity of the condenser K² be large very considerable discharges might pass from either $a'$ or $b'$ toward D but be practically earthed at the condenser K² before passing to the machine, but if any surplus passes toward the machine it is again made to act through the condenser K to equalize the potentials.

Fig. 10 is simply intended to show that the condenser may be replaced by a counter-electromotive force battery between the lines $a\ b$, when the current is of a continuous character, and may be used in conjunction with the condenser K' to act in very much the same way as the triple condenser or equalizing condenser, Fig. 1; also that the potentials between the sides of the line $a\ b$ may easily equalize themselves through the device K whose potential is limited to that of the normal difference which exists between $a\ b$. Hence it equalizes such discharges on the two sides of the line and enables the condenser K also to act to prevent rupture or discharge through the insulation.

Fig. 11 shows another way to provide for the elevation of the potential of the core D' when the winding potential is raised by static discharges. In this case there are two double coils T T', one coil of each double coil being connected, respectively, into each line and the remaining two coils connected in series from the condenser K to the connection P. The directions of the windings, relatively, are selected so that a discharge coming along through the line will induce a current in the coil connected to the line P of such direction as to produce the same potential in the core D' as is communicated to the winding W by the discharge itself, this connection being made so that either line $a'\ a'$ or $b'\ b'$ may so act on the coils connected to P that it will be sufficient also so far as the induction required between the two sides of the line is concerned; that is, an induced discharge through the agency of this arrangement when passing on one side, or in one line, sets up an induced discharge in the other line to balance it. The condenser K has one side connected to the coil just mentioned and its other side connected to the earth plate E, and discharge gaps.

What I claim as new, and desire to secure by Letters Patent, is—

1. The combination of a supply circuit, an apparatus therein whose parts are insulated from each other, conductive connections from each of said parts, such connections being placed in inductive relation distinct from the inductive relation of the insulated parts themselves, the arrangement being such that the insulated parts are maintained at an approximately equal potential by induction as distinguished from discharge.

2. The combination of a supply circuit, an apparatus therein whose parts are insulated from each other, conductive connections from each of said parts, such conductive connections being placed in inductive relation by means of a condenser; whereby the insulated parts are kept at an approximately equal potential by induction.

3. In combination, a line circuit, an apparatus to be protected against disruptive discharge having a winding connected thereto and a core insulated therefrom and an inductive connection between such line and core through a condenser; whereby the line and core are kept at an approximately equal potential by induction.

4. The combination, with a circuit having two different portions, of an apparatus to be protected against static discharge having a winding or insulated part with its ends respectively connected to the different portions of the circuit, said portions being brought into inductive relation with each other between the apparatus and the working portion of the circuit.

5. The combination with a line, and an apparatus connected thereto, and having a winding connected at its ends to different portions of the circuit, and a core, or portion insulated from such winding—of a path or connection for discharges of high potential—between such different portions of the line, and a path from each of such circuit portions to the insulated core, and including a dielectric portion preventing the passage of the line current—but transmitting discharges of high potential.

6. The combination of a line, an apparatus having a portion connected to such line, and a portion insulated therefrom, inductive connections between the said line and insulated portion, and a path to ground from the inductive connection, and including a discharge gap.

7. The combination with a line and an apparatus having portions insulated from one another—of connections from the line to one of said portions, and including a reactive coil, and an inductive connection or path from the line to the other portions of the apparatus.

In witness whereof I have hereunto set my hand this 22d day of August, 1891.

ELIHU THOMSON.

Witnesses:
JOHN W. GIBBONEY,
BENJAMIN B. HULL.